Patented Aug. 27, 1935

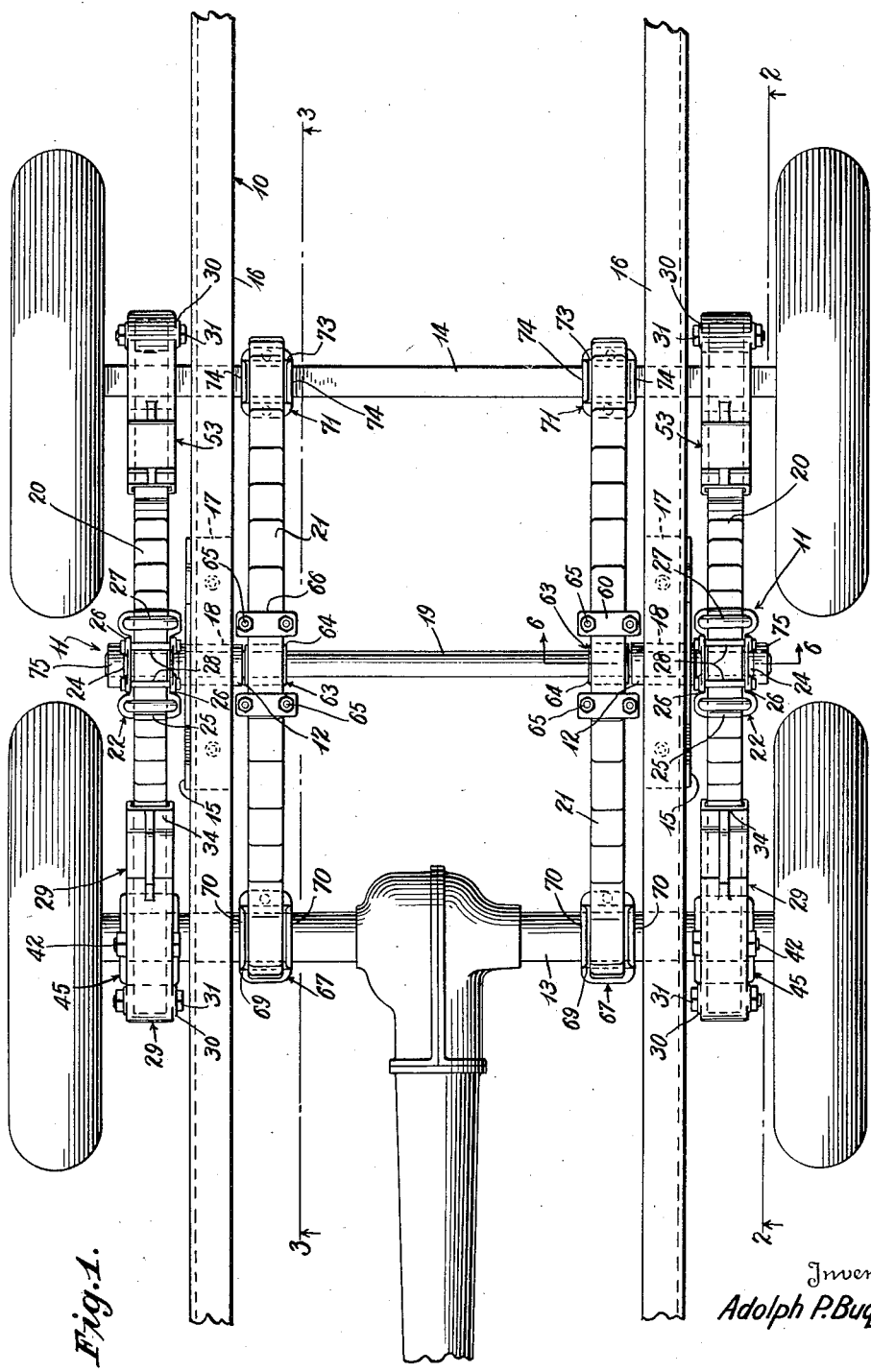

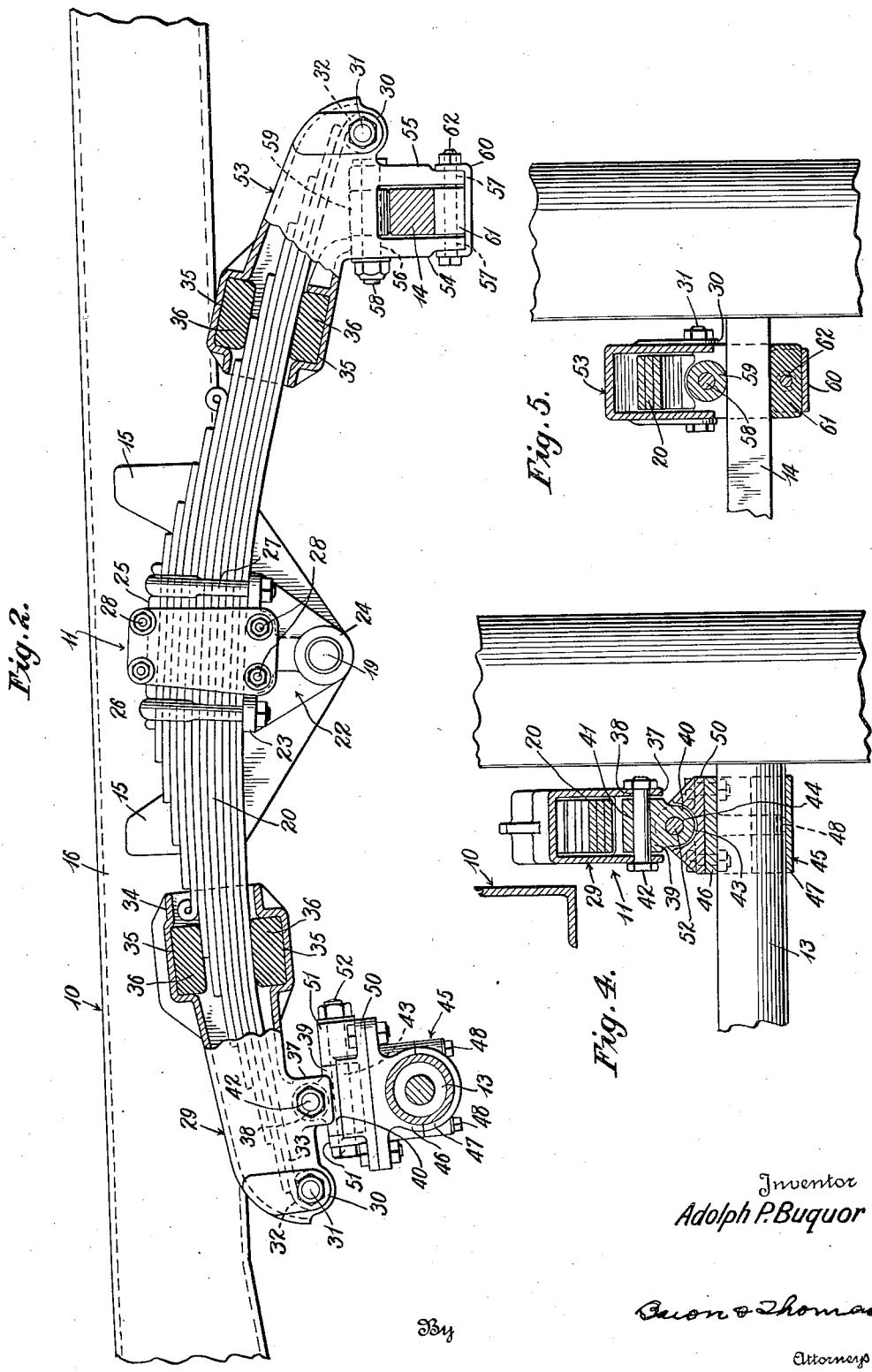

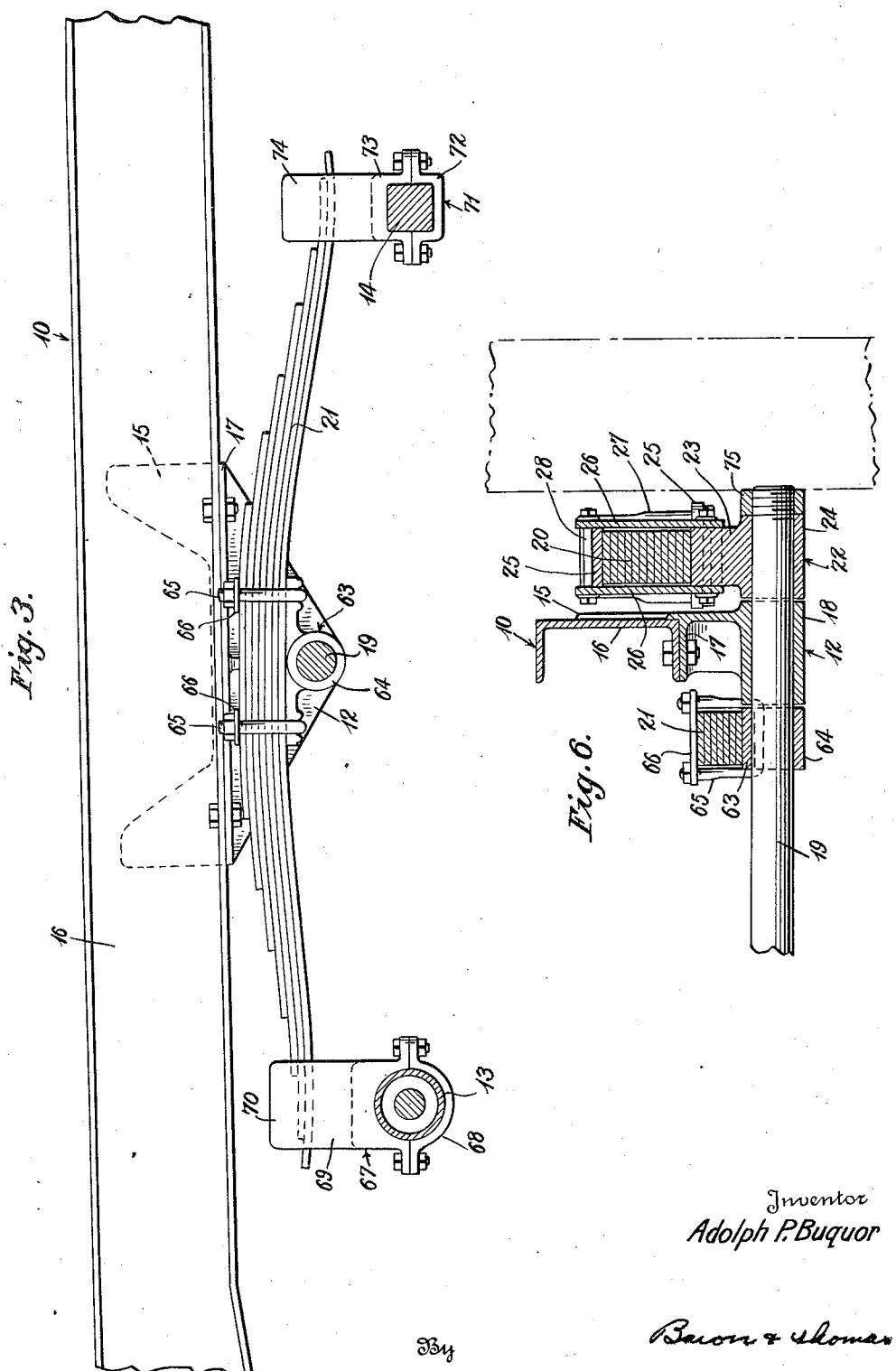

2,012,752

UNITED STATES PATENT OFFICE 2,012,752

SUSPENSION AND LOAD EQUALIZING SYSTEM FOR VEHICLES

Adolph P. Buquor, York, Pa., assignor to Martin-Parry Corporation, York, Pa., a corporation of Delaware Application February 21, 1933, Serial No. 657,911

6 Claims. (Cl. 280—124)

My invention relates to a suspension and load equalizing system for vehicles, and more particularly to a suspension and load equalizing system for tandem pairs of wheels.

It is known that vehicles having more than the conventional four wheels and having the load properly equalized upon the wheels are capable of carrying much greater useful loads without imposing excessive concentrated loads upon the road. Difficulties have been encountered, however, in providing a sturdy flexible mechanism for mounting the plurality of wheels and for properly distributing the load among the wheels. For example, in a motor vehicle having tandem pairs of rear wheels, such a mechanism, to meet the requirements of operation, must provide for proper linear spacing of the pairs of wheels; for free relative angular movement between adjacent axles to adapt the vehicle to uneven road surfaces; for controlled relative transverse movement of the pairs of wheels when the vehicle is rounding a curve; and for proper proportional load distribution to all the wheels under all conditions of service.

Another object of my invention is to provide a load equalizing and suspension system for motor vehicles having tandem pairs of rear wheels, wherein relative angular movement between the axles is permitted to adapt the vehicle to uneven roads and relative transverse movement of the tandem pairs of wheels is permitted to enable the vehicle to round curves without imposing undue strain upon the suspension system.

Another object of the invention resides in the provision of auxiliary springs in a suspension and load equalizing system for tandem pairs of wheels, wherein main suspension springs support the vehicle and load under light load conditions and absorb usual road shocks and the auxiliary springs assist in absorbing unusually heavy road shocks and carry part of the load when the vehicle is heavily loaded.

Another object of the invention is to provide such a suspension system in which the springs are relieved of torsional stresses due to angular movement of the axles when the vehicle is traveling upon uneven road surfaces.

A further object of the invention is to provide a suspension and load equalizing system for vehicles having tandem pairs of wheels and auxiliary springs, wherein the auxiliary springs are effective under all conditions of service to keep the pairs of wheels in proper tandem alignment.

A still further and more specific object of the invention resides in the provision of a device whereby a standard motor vehicle having the conventional number of wheels may be easily converted into a vehicle having tandem pairs of rear wheels so as to increase the load carrying capacity of the vehicle.

Other advantages and objects of my invention will appear in the following description of the preferred embodiment of my invention shown in the attached drawings, of which;

Fig. 1 is a plan view of a portion of a vehicle chassis embodying my invention;

Fig. 2 is a partial sectional view on line 2—2 of Fig. 1;

Fig. 3 is a partial sectional view on line 3—3 of Fig. 1;

Fig. 4 is a detail of the front connection between the main spring and the driven axle;

Fig. 5 is a detail of the connection between the main spring and the dead axle.

Fig. 6 is a sectional view on line 6—6, Fig. 1.

Referring more particularly to the drawings, 10 indicates the frame of the vehicle, 11 indicates in general the suspension mechanism, 12 indicates the brackets attaching the suspension mechanism to the frame, 13 indicates the driven axle housing, and 14 the dead axle housing. Brackets 12 comprise vertical plates 15 adapted to be positioned against the outer surfaces of members 16 of the frame 10, horizontal plates 17 upon which the frame member 16 rests, and journal members 18 to receive a transverse shaft 19. The bracket 12 may be built up of plate stock integrally welded together or cast integrally and may be secured to frame member 16, as by riveting, welding or bolting. As shown in Fig. 1, shaft 19 stands entirely across the vehicle frame and forms a support for main springs 20 exteriorly of the frame member 16 and for auxiliary springs 21 internally of the frame members 16.

As shown in Fig. 2, main springs 20 are pivotally mounted upon shaft 19 by brackets 22 and are positioned above the shaft. Brackets 22 comprise the base casting 23 having a journal portion 24 to receive the shaft 19, a top plate 25 and the side plates 26. Laminated spring 20 is pressed between base members 23 and top plate 25 by bolts 27, and the side plates 26 are held together by bolts 28 to hold the spring laminations in vertical alignment.

The forward end of each spring is provided with a boot 29 adapted to be slipped over the end of the spring. The boot 29, which may be a casting, is provided with depending lugs 30, bored to receive a spring bolt 31 passing through the spring eye 32 in the end of the main leaf 33 of the spring 20. The end 34 of the boot 29, which is nearest the center of the spring 20, is provided with upper and lower recesses 35 to receive rubber blocks 36 which bear against the spring 20 to cushion shocks transmitted from the wheel axles to the spring. The boot is also provided intermediate its ends with depending lugs 37 provided with transverse aligned bores 38 below the spring 20. The lugs 37 are laterally spaced to receive between them the upper portion 39 of a universal member 40. The universal member 40 has a bore 41 in alignment with the bores 38 of the lugs 37 and a bolt 42 extending through the lugs 37 and universal member 40 provides for pivotal movement between the universal member and the boot 29. The universal member 40 is also provided with a lower portion 43 having a bore 44 extending at right angles to the bore 41 and positioned therebelow.

An axle attaching device 45 is rigidly clamped to the driven axle housing adjacent each end thereof and comprises upper and lower halves 46 and 47 respectively secured together by bolts 48 in clamping relation about the axle housing 13. The upper half 47 of the axle attaching device is provided with a surface 49 adapted to receive a member 50 having upstanding lugs 51 receiving between them the lower portion 43 of the universal member 40. The lugs 51 have bores aligned with the bore 44 of the universal member and a bolt 52 extending through the aligned bores allow pivotal movement between the axle attaching device and the universal member 40.

The rear end of the spring 20 is also provided with a boot 53 adapted to be slipped over the end of the spring. The boot 53 is also provided with depending lugs 30 to receive the spring bolt 31 passing through bores 32 in the lugs and an eye formed in the main leaf 33 of the spring 20. The boot 53 is also provided with upper and lower recesses 35 to receive rubber blocks 36 bearing upon spring 20, similarly to boot 29.

Boot 53 is provided with depending portions 54 and 55, intermediate its ends. Depending portions 54 and 55 are spaced longitudinally of the boot and are provided with upper aligned bores 56 and lower aligned bores 57. A bolt 58 extends through the upper bores 56 and the roller 59 is journaled on the bolt 58 between the depending members 54 and 55. A U-shaped plate 60 has its center portion positioned against lower ends of the members 54 and 55 and its arms extending upwardly against the outer surfaces of the members 54 and 55. A rubber block 61 is supported by the plate 60 and a bolt 62 passing through the arms of plate 60, bores 57 in the members 54 and 55 and rubber block 61 holds the plate 60 and rubber block securely in position.

As shown in Fig. 2, the roller 59, members 54 and 55, and the rubber block 61 define a rectangular aperture which is adapted to receive the dead axle. It is to be noted that the dead axle is rectangular or square in cross section, such that the axle is prevented from turning within the aperture. It is to be noted further that free axial movement of the dead axle is permitted by the roller 59 and that the rubber block 61 prevents undue vertical play of the dead axle while allowing relative angular movement between the driven axle and the dead axle.

As stated above, the shaft 19 extends entirely across the vehicle frame and auxiliary springs are mounted thereupon interiorly of the frame members 16. Auxiliary springs 21 are of laminated construction, as shown in Fig. 3, and can have a lesser number of leaves than the main springs 20. Auxiliary springs 21 extend above the shaft 19 and are secured thereto by means of brackets 63, each of which comprises a member 64 bored to receive the shaft 19. Each spring 21 is secured to the member 64 by means of U bolts 65 and top plates 66. The opposite ends of the spring 21 extend forwardly and rearwardly and are positioned under normal loading conditions somewhat above the driven axle housing 13 and the dead axle 14 respectively. Spring guiding assemblies 67 are rigidly secured to the driven axle housing, as shown in Fig. 3, and comprise lower member 68 and upper member 69 clamped about the housing 32. The upper member 69 of each assembly 67 has a pair of upstanding lugs 70 which are spaced longitudinally of the housing 13 to receive between them the forward end of a spring 21. Similarly, spring guiding assemblies 71 are rigidly fastened to the dead axle 14 and comprise a lower member 72 and an upper member 73 clamped about the axle 14. The upper member 73 is provided with a pair of upstanding lugs 74 which are spaced to receive the rear end of a spring 21.

As shown in Fig. 1, the brackets 22 carrying main springs 20 are held against the journal member of the bracket 12 by nuts 75 upon the ends of the shaft 19, and it will be seen that the member 64 of the auxiliary spring bracket 63 is held against the journal member of the bracket 12 by means of the lug 70 of the spring guiding assembly 67 and the lugs 74 of the spring guiding assembly 71 through the spring 21.

In operation of the device above described, normal loads are carried by the main springs 33 and all usual road shocks under light loads are absorbed thereby. Since the main springs are pivoted upon the rock shaft 19, the load is distributed between the two axles 13 and 14. If desired, a greater proportion of the load may be placed upon the driven axle 13 by making the distance between this axle and the rock shaft 19 somewhat less than the distance between the rock shaft and the dead axle 14. The transverse pivotal connection 42 between the driven axle 13 and the spring 33 allows this axle to move longitudinally of the frame when either or both of the wheels carried by this axle drop into a depression or are raised above their normal position. Also, the longitudinal pivotal action about the bolts 52 connecting the universal member 40 and the axle attaching device 45 allows the driven axle 13 to have a transverse tilting movement when one of the wheels carried by this axle is above or below the other wheel, without transmitting a torsional or twisting stress to the spring 33.

As stated above, the dead axle 14 has free longitudinal movement with respect to the springs 33 and a roller 59 is provided for reducing friction between the axle and the boot 53. The dead axle 14 is restrained from rotation by the depending arms 54 and 55 carried by the boot 53 and vertical play of the axle with respect to the boot 53 is prevented by the rubber block 61. By this arrangement, the dead axle 14 is also allowed transverse tilting movement without transmitting torsional or twisting stresses to the spring 33. This construction also allows the axle 14 to move transversely of the frame when the vehicle is rounding a curve, as well as allowing relative movement between the spring and axle due to the increased distance between the spring ends when one of the wheels carried by this axle, is above or below the other wheel when negotiating uneven road surfaces.

It is to be noted that the boots 29 and 53 positioned upon the spring ends allow either or both axles to be positioned inwardly of the spring ends. This construction is effective to stiffen the spring 33 and enables heavier loads to be carried upon a standard spring furnished with a conventional four-wheeled vehicle. The rubber blocks 35 positioned between the boots 29 and 53 and the spring 33 cushion the shocks between the axles and the spring, more effectively distribute the stress over the spring and eliminate undesirable noises in operation.

As shown in Fig. 3, the auxiliary springs 21 are also mounted for pivotal movement around shaft 19 and have their ends positioned for normal loads somewhat above the axles 13 and 14. When the vehicle is heavily loaded, the shaft 19 is forced downwardly, carrying the spring ends against the axles and the auxiliary springs are effective to carry a portion of the load. Also, unusual road shocks will force the ends of the spring against the axles and cause the springs to assist in absorbing such shocks. Since the auxiliary springs are pivotally mounted upon the shaft 19, the load carried by them is distributed between the axles in the same proportions that the load carried by the main springs 20 is distributed between the axles. The ends of the spring 21 are restrained from movement longitudinally of the axles by the upstanding lugs 70 and 74 of the axle attaching devices 67 and 73 respectively. The rear end of the springs 21 effectively maintain the wheels carried by the axle 14 in alignment with the wheels carried by the axle 13. The springs 21 have sufficient flexibility to allow for transverse movement of the axle 14 when the vehicle is rounding a curve and return the axle to its proper position when the vehicle is again moving in a straight line. It will be seen that by this arrangement the auxiliary and lighter springs absorb all stresses in a direction longitudinal of the axle 14 and relieve the stiffer main springs 20 of the stresses which would tend to distort and twist the main springs and their mountings.

From the above description, it will be seen that I have provided a simple and rugged device for suspending and equalizing the load of a motor vehicle upon a plurality of wheels, in which independent movement of the wheels is permitted and the load is proportionally divided among the various wheels. While I have disclosed the preferred embodiment of my invention, it is to be understood that changes in construction may be made within the spirit of the invention and the scope of the following claims:

I claim as my invention:

1. In a suspension and load equalizing system for motor vehicles, a vehicle frame, tandem pairs of wheels for supporting the frame, axles for said wheels, a pair of elongated laminated springs pivoted intermediate their ends to the frame and having their opposite ends connected to said axles, one of said axles having free axial movement with respect to said springs, and auxiliary means carried by said frame for controlling the axial movement of said axle.

2. In a suspension and load equalizing system for motor vehicles, a vehicle frame, tandem pairs of wheels for supporting the frame, axles for said wheels, a pair of elongated laminated springs pivoted intermediate their ends to the frame and having their opposite ends connected to said axles, one of said axles having free axial movement with respect to said springs, and auxiliary spring means carried by said frame for maintaining the wheels in alignment.

3. In a suspension and load equalizing system for motor vehicles, a vehicle frame, a rock shaft mounted on said frame and extending thereacross, laminated leaf springs pivotally mounted intermediate their ends upon said rock shaft, tandem pairs of wheels for said vehicle, axles carrying said wheels and connected to said springs adjacent the ends thereof, the connections to one of said axles having bearing means providing free movement of the axle longitudinally of the axle, with respect to said springs, auxiliary laminated leaf springs also mounted intermediate their ends upon said rock shaft and having their ends associated with said axles to support a portion of the load when the vehicle is heavily loaded, said auxiliary springs being effective to control the longitudinal movement of said latter mentioned axle.

4. In a suspension and load equalizing system for vehicles, a vehicle frame, laminated leaf springs pivotally mounted upon said frame, tandem pairs of wheels, spaced parallel axles carrying said wheels, connections between said axles and said springs adjacent the ends thereof comprising boots positioned over the ends of said springs, said boots being pivotally connected at their end remote from the center of the springs to the extremity of said springs and having resilient members between said springs and the portion of said boots nearest the centers of said springs, said axle being connected to said boots between said pivotal connections and said resilient members.

5. In a suspension and load equalizing system for vehicles, a vehicle frame, laminated leaf springs pivotally mounted upon said frame, tandem pairs of wheels, spaced parallel axles carrying said wheels, connections between said axles and said springs adjacent the ends thereof, said connections to one of said axles comprising a universal member allowing movement of the axle longitudinally of the frame and transverse tilting thereof, the connections to the other of said axles having means providing for free movement relative to said springs of said other axle in a direction transversely of the frame, and means carried by said vehicle frame for controlling the transverse movement with respect to the frame of said other axle.

6. In a suspension and load equalizing system for motor vehicles, a vehicle frame, a rock shaft mounted on said frame and extending thereacross, main laminated leaf springs pivotally mounted intermediate their ends upon said rock shaft, tandem pairs of wheels for said vehicle, axles carrying said wheels and connected to said springs adjacent the ends thereof, auxiliary laminated leaf springs spaced laterally from said main laminated springs also mounted intermediate their ends upon said rock shaft and having their ends positioned above said axles, guiding means secured upon said axles having spaced upstanding lugs, said auxiliary springs having each of their ends positioned between the lugs of a guiding means.

ADOLPH P. BUQUOR.